(12) United States Patent
Kresge

(10) Patent No.: US 6,688,800 B2
(45) Date of Patent: Feb. 10, 2004

(54) COUPLING DEVICE

(76) Inventor: David Wayne Kresge, 6 Cricket Ct., No. Haven, CT (US) 06473

( * ) Notice: Subject to any disclaimer, the term of this patent is extended or adjusted under 35 U.S.C. 154(b) by 65 days.

(21) Appl. No.: 09/841,574

(22) Filed: Apr. 24, 2001

(65) Prior Publication Data

US 2002/0164205 A1 Nov. 7, 2002

(51) Int. Cl.$^7$ ................................................ F16B 21/00
(52) U.S. Cl. ...................... 403/322.1; 403/325; 403/327
(58) Field of Search .............................. 403/321, 322.1, 403/322.4, 325, 326, 327

(56) References Cited

U.S. PATENT DOCUMENTS

| | | | | |
|---|---|---|---|---|
| 1,844,410 A | * | 2/1932 | Schalk ........................ 160/46 |
| 1,896,645 A | * | 2/1933 | Pfauser ....................... 403/321 |
| 2,117,947 A | * | 5/1938 | de Rome et al. ........... 292/352 |
| 2,489,864 A | * | 11/1949 | Cravener ................. 294/119.1 |
| 2,616,633 A | * | 11/1952 | Reynolds ................. 242/571.3 |
| 3,449,003 A | * | 6/1969 | Hunt ........................... 403/324 |
| 4,042,305 A |   | 8/1977 | Vincent ....................... 403/14 |
| 4,433,934 A | * | 2/1984 | Cleveland ................... 403/318 |
| 4,597,472 A | * | 7/1986 | Hjelm ...................... 182/178.6 |
| 5,083,883 A | * | 1/1992 | Ueda et al. ................. 403/316 |
| 5,287,869 A | * | 2/1994 | Wu ............................ 135/25.1 |
| 5,531,140 A | * | 7/1996 | Chow ......................... 403/325 |
| 6,006,477 A | * | 12/1999 | Ko ........................... 403/109.1 |
| 6,079,894 A | * | 6/2000 | Obitts ......................... 135/75 |
| 6,199,457 B1 | * | 3/2001 | Hoff et al. .................. 403/325 |
| 6,213,672 B1 | * | 4/2001 | Varga ......................... 15/144.4 |

* cited by examiner

*Primary Examiner*—Gary S. Hartmann
(74) *Attorney, Agent, or Firm*—McCormick, Paulding & Huber LLP

(57) ABSTRACT

A shaft coupling device is provided that includes a first portion, a second portion, a plunger, and a spring. The first portion includes a female mating section and a shaft mounting section. The female mating section includes a first cavity surrounded at least in part by a wall. An aperture extends through the wall. The second portion includes a male mating section and a shaft mounting section. The male mounting section is sized so as to be receivable within the cavity of the female mating section. The male mounting section includes a second cavity surrounded at least in part by a wall, and an aperture extending through that wall. The plunger has a body with a width and a length, and the length is greater than the width. A flange is attached to one end of the body. The plunger is disposed within the second cavity of the male mating section and the body of the plunger extends through the aperture within the wall of the male mating section. The spring is disposed within the cavity of the male mating section, and acts between the wall of the male mating section and the plunger. In a coupled state, the male mating section is received within the cavity of the female mating section and the body of the plunger extends through the apertures within the male and female mating sections and is biased in place by the spring.

6 Claims, 1 Drawing Sheet

# COUPLING DEVICE

BACKGROUND OF THE INVENTION

1. Technical Field.

This invention relates to mechanical coupling devices in general, and to mechanical coupling devices that are hand operable in particular.

2. Background Information.

Presently available coupling devices for selectively coupling shaft sections typically utilize an attachment mechanism such as an independent pin or key, screw threads, or a spring-loaded cylindrical or spherical shaped button mounted. A problem with coupling devices that utilize an independent pin or key is that the pin or key is often misplaced and/or requires a tool for implementation. A problem with coupling devices that utilize screw threads is that if the application requires that the shaft be rotated, the threaded sections can become detached from one another. If a shaft section becomes decoupled in an inaccessible area (e.g., a chimney), the shaft section remaining in the inaccessible area can present a significant problem.

Presently available coupling devices that utilize spring-loaded cylindrical or spherical shaped buttons solve some of the problems associated with screw threads and pins, but they too have disadvantages or are limited in application. Spring-loaded cylindrical or spherical shaped button-type couplings are typically utilized on applications where the shafts to be coupled are thin wall type shafts; e.g., vacuum shaft sections. The button is mounted on the male portion of the coupling and is biased outwardly. Inserting the male portion of the coupling into the female portion causes the button to be deflected inwardly, thereby allowing the male portion to be received within the female portion. When the outwardly biased button encounters an aperture within the female portion, the button extends outwardly through the aperture in the thin wall of the female portion and thereby positively couples the male and female portions and the shafts attached thereto. The male and female portions can be decoupled by applying pressure from a finger on the button, pushing the button inwardly below the inner surface of the female portion. This manner of decoupling works well for thin wall applications because skin from the operator's finger will extend a distance into the aperture provided sufficient pressure is applied. The distance the finger extends into the aperture is substantially equal to or greater than the wall thickness of the female coupling portion.

Applications that require a stronger shaft and coupling device, particularly those where rotational torque is transmitted through the shaft, often utilize a thick wall coupling device. Some existing thick wall coupling devices utilize a spring mounted cylindrical button in the same manner as that described above. One problem with using a cylindrically shaped button in a thick wall coupling device application is that it becomes difficult or impossible to depress the button by finger (hereinafter "finger" shall be defined as any digit on a hand including a thumb) below because the finger skin only extends a limited amount into the aperture. Consequently, the finger by itself is unable to depress the button inwardly a distance sufficient to disengage the button from the aperture within the female portion. This is particularly true in applications where the operator is wearing work gloves that are less compliant than skin. In such cases, it becomes necessary to use a tool to depress the button the required distance. Another problem with using a cylindrical button in a cylindrical thick wall coupling device is that the button extending between the male and female portions carries any load torsionally or axially transmitted between shaft sections. As a result, the ability of the shaft sections to transmit a load is likely to be limited by the strength of the cylindrical button.

What is need therefore, is a coupling device that does not utilize independent loose parts, one that will not unintentionally decouple, one that is easily hand operated, and one that provides a favorable torsional loading capability.

DISCLOSURE OF THE INVENTION

It is therefore, an object of the present invention to provide a unitary coupling device that will not unscrew, one that can be hand operated, and one that provides a favorable torsional loading capability.

According to the present invention, a shaft coupling device is provided that includes a first portion, a second portion, a plunger, and a spring. The first portion includes a female mating section and a shaft mounting section. The female mating section includes a first cavity surrounded at least in part by a wall. An aperture extends through the wall. The second portion includes a male mating section and a shaft mounting section. The male mounting section is sized so as to be receivable within the cavity of the female mating section. The male mounting section includes a second cavity surrounded at least in part by a wall, and an aperture extending through that wall. The plunger has a body with a width and a length, and the length is greater than the width. A flange is attached to one end of the body. The plunger is disposed within the second cavity of the male mating section and the body of the plunger extends through the aperture within the wall of the male mating section. The spring is disposed within the cavity of the male mating section, and acts between the wall of the male mating section and the plunger. In a coupled state, the male mating section is received within the cavity of the female mating section and the body of the plunger extends through the apertures within the male and female mating sections and is biased in place by the spring.

According to one aspect of the present invention, the female mating section includes a cutout that intersects with the aperture disposed within the wall of the female mating section. The cut out is positioned so that base of the cutout substantially intersects with the inner wall surface that defines the cavity.

An advantage of the present coupling device is that it can be readily hand operated. The extended length of the present plunger provides a surface long enough so that the curvature of a finger will enable the finger to depress the plunger a distance substantially equal to or below the inner wall surface of the cavity of the female mating section, thereby enabling decoupling of the first and second portions of the coupling device without the use of a tool. In addition, in those embodiments that include the above-described cutout, the cutout enables the finger to be oriented perpendicularly relative to the length of the plunger when depressing the plunger. The depth of the cutout permits the operator's finger to depress the plunger below the inner wall surface of the cavity of the female mating device, thereby enabling decoupling of the first and second portions of the coupling device without the use of a tool.

Another advantage of the present coupling device is the load capacity it provides, and in particular the torsional load capacity it provides. Existing coupling devices that utilize a cylindrical button extending between cylindrical male and female portions have limited torsional load capacity relative to the present coupling. Specifically, the extended length of the present plunger and the increased wall surface area against which it acts within the apertures disposed in the male and female mating sections, serve to distribute the load along the length of the plunger and thereby minimize the load per unit area. As a result, the coupling device can accommodate a higher magnitude load than is possible with present button-type coupling devices. This attribute is particularly important for applications where the coupling is driven by a power source other than by hand. For example, in many chimney, duct, or pipe cleaning applications it is desirable to use a cleaning head attached to a shaft that is driven by a rotary device such as a drill or other drive motor. Since drive motors can impart significantly more torque than can be applied by hand, it is critical that the coupling between shafts and/or between a shaft and a cleaning head be able to accommodate the additional torque.

Another advantage provided by the present coupling device is that the two portions of the coupling device will not unscrew from one another or otherwise uncouple during use. A person of skill in the art will recognize the significant problems can arise should, for example, a cleaning tool, become uncoupled in a blind application such as a chimney, flue, or vent.

Another advantage of the present coupling device is that it does not require a loose independent piece such as a pin or screw to couple two shaft lengths.

These and other objects, features, and advantages of the present invention will become apparent in light of the detailed description of the present invention.

DETAILED DESCRIPTION OF THE INVENTION

Figure 1:
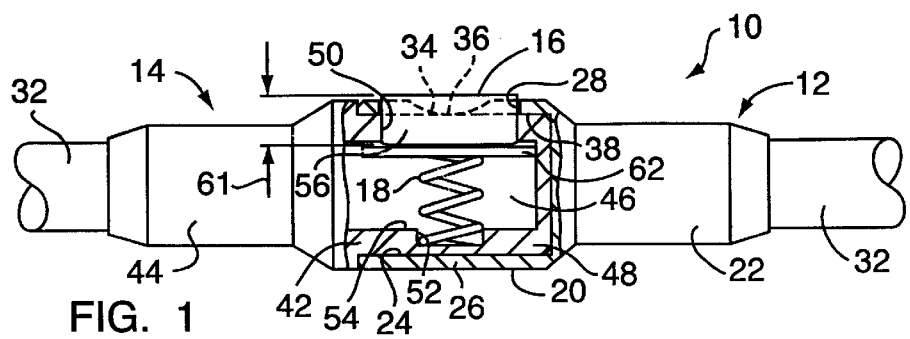
FIG. 1 is a diagrammatic view of the present coupling device sectioned in part.

Now referring to FIGS. 1–7, a shaft coupling device 10 is provided that includes a first portion 12, a second portion 14, a plunger 16, and a spring 18. The first portion 12 (see FIGS. 1, 2, 5, and 6) includes a female mating section 20 and a shaft mounting section 22. The female mating section 20 includes a cavity 24 surrounded by a wall 26. In the exemplary embodiment shown in FIGS. 1–7, the coupling device 10 is shown cylindrically shaped. The coupling device 10 can assume other shapes alternatively in part or in whole. An aperture 28 extends through the wall 26, and the aperture has a length 29, a width 31, and an axis 33. In the preferred embodiment (shown in FIGS. 5 and 6), the cavity 24 extends out through the female mating section 20 of the first portion 12. The cavity 24 may alternatively extend from the opposite side, or extend all the way through the first portion 12. The aperture 28 has a shape that is complimentary (also be referred to as mating) to the shape of the plunger 16, as will be described below, to enable a slide fit between the plunger 16 and the female mating section 20. The shaft mounting section 22 includes a cavity 30 for receiving a shaft 32. The shaft 32 can be attached to the first portion 12 by a crimp, solder, weld, pin, bond, screw, etc.

Now referring to FIGS. 1, 2, 5, and 6, according to one aspect of the present invention, the female mating section 20 includes a cutout 34 that intersects with the aperture 28 disposed within the wall of the female mating section 20. The cutout 34 is positioned so that base 36 of the cutout 34 substantially intersects with the inner wall surface 38 that defines the cavity 24 within the female mating section 20. The width 40 of the cutout 34 is selected to accommodate the size of an operator's finger, and in some applications a finger covered by a glove. The cutout 34 shown in FIGS. 1, 2, 5, and 6 is oriented substantially perpendicular to the length 29 of the aperture 28 within the female mating section 20. An advantage of the perpendicular orientation is that it facilitates operation by enabling the operator to access the plunger 16 in two different directions, which can be quite helpful in applications where space is tight.

Now referring to FIGS. 1–4, the second portion 14 includes a male mating section 42 and a shaft mounting section 44. The male mounting section 42 is sized so as to be receivable within the cavity 24 of the female mating section 20. The male mating section 42 is shaped to mate with the cavity 24 of the female mating section 20. In the present exemplary embodiment, as stated above, the coupling device 10 is shown cylindrically shaped and the male mating section 42 is therefore cylindrical. The male mounting section 42 includes a second cavity 46 surrounded by a wall 48. In the preferred embodiment (shown in FIGS. 3 and 4), the cavity 46 extends out through the shaft mounting section 44 of the second portion 14. The cavity 46 may alternatively extend from the opposite side, or extend all the way through the second portion 14. An aperture 50 extends through the wall 48 of the male mounting section 42. The aperture 50 has an axis 51, a length 53, and a width 55. The aperture 50 has a shape that is complimentary to the shape of the plunger 16, as will be described below, to enable a slide fit between the plunger 16 and the male mating section 42. In a preferred embodiment, the male mounting section 42 includes a spring seat depression 52 disposed in the inner wall surface 54, aligned with the aperture 50.

Figure 2:
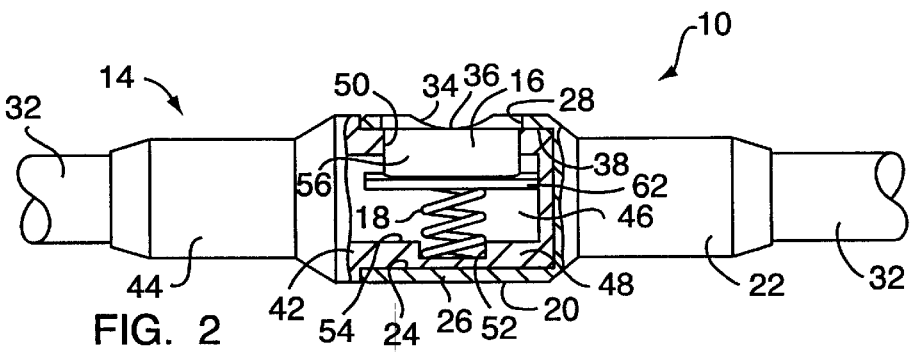
FIG. 2 is the diagrammatic view of FIG. 1, showing the plunger depressed.
Figure 3:
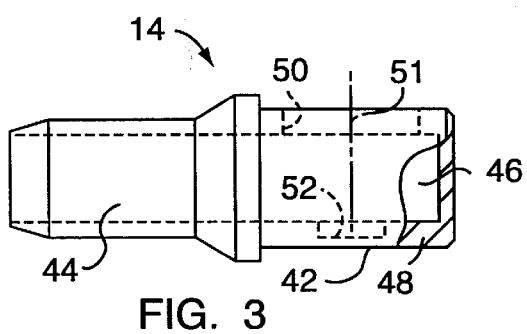
FIG. 3 is a side view of the male portion of the present coupling device.
Figure 5:
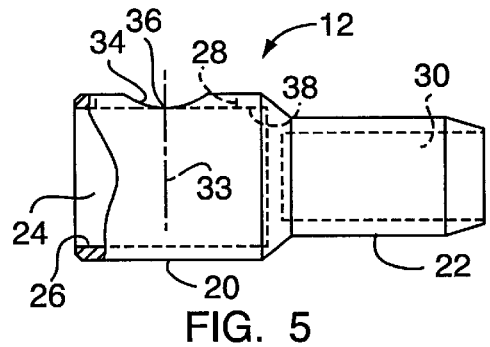
FIG. 5 is a side view of the female portion of the present coupling device.
Figure 4:
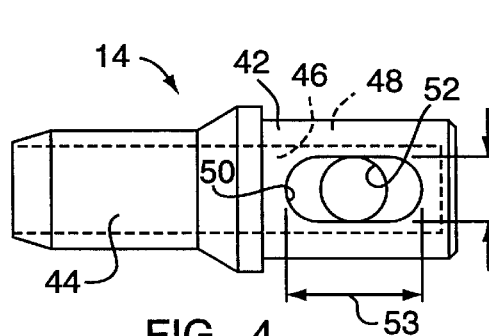
FIG. 4 is a top view of the male portion of the present coupling device.
Figure 6:
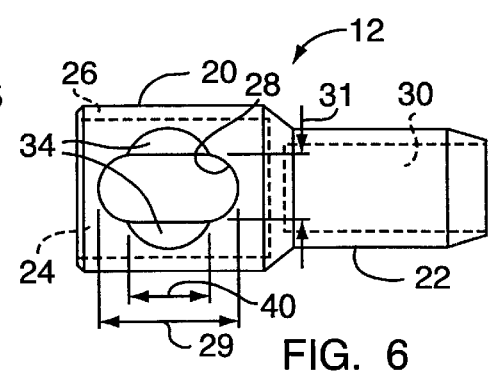
FIG. 6 is a top view of the female portion of the present coupling device.
Figure 7:
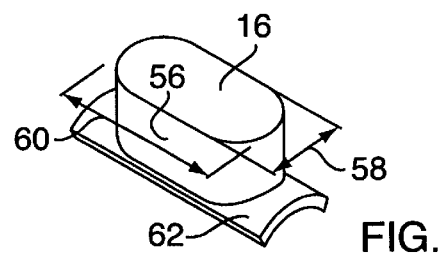
FIG. 7 is a diagrammatic view of the plunger of the present coupling device.

Now referring to FIGS. 1, 2, and 7, the plunger 16 has a body 56 with a width 58, a length 60, a height 61, and the length 60 is greater than the width 58. The width 58 and the length 60 extend in a plane that is substantially perpendicular to the height 61. As shown in FIGS. 1, 2, and 7, a flange 62 is attached to one end of the body 56. In a preferred embodiment of the plunger 16, the plunger 16 has a length 60 that is substantially twice that of the width 58. The plunger 16 is not limited to the oval shape shown in FIGS. 1, 2, and 7, and can be shaped otherwise; e.g., rectangular, elliptical, etc. Referring to FIGS. 1 and 2, the plunger 16 is disposed within the 46 cavity of the male mating section 42 and the body 56 of the plunger 16 extends through the aperture 50 within the wall 48 of the male mating section 42. The plunger 16 is positioned relative to the aperture 50 so that the height 61 of the plunger 16 is substantially parallel the axis 51 of the aperture 50. In this position, the length 60 of the plunger 16 is substantially parallel to the length 53 of the aperture 50.

The preferred embodiment of the spring 18 is a coil spring. Alternative biasing means including, but not limited to, a leaf spring, elastic material, etc., can be used as well to accommodate different applications. The amount of force provided by the spring 18 can vary to suit the application. The spring 18 is disposed within the cavity 46 of the male mating section 42, and acts between the wall 48 of the male mating section 42 and the plunger 16. In the preferred embodiment, one end of the coil spring is seated within the spring seat depression 52 disposed within the wall 48 of the male mating section 42.

Referring to FIG. 1, in a coupled state the male mating section 42 is received within the cavity 24 of the female mating section 20 and the body 56 of the plunger 16 extends through the aligned apertures 28,50 within the male mating section 42 and the female mating section 20. The plunger 16 is positioned relative to the apertures 28,50 such that the height 61 of the plunger 16 is substantially parallel the axes 31,51 of the apertures 28,50. In this position, the length 60 of the plunger 16 is substantially parallel to the lengths 29,53 of the apertures 28,50. The spring 18 biases the plunger 16 in place. Now referring to FIG. 2, the first portion 12 and the second portion 14 of the coupling device 10 are uncoupled by depressing the plunger 16 with the operator's finger to a point where the plunger 16 is at or inside of the inner wall surface 38 of the cavity 24 within the female mating portion 20. Once the plunger 16 is depressed, the first portion 12 and the second portion 14 can be pulled apart to decouple.

Although this invention has been shown and described with respect to the detailed embodiments thereof, it will be understood by those skilled in the art that various changes in form and detail thereof may be made without departing from the spirit and scope of the invention. For example, the present coupling device 10 has been described above in the context of coupling shafts together. The present coupling device 10 is not limited, however, to shaft applications and can be used for a variety of applications where two components need to be positively attached to one another; e.g., attaching a tool to a shaft, etc. In addition, the present coupling device can be used to connect cables, hoses, etc.

What is claimed is:

1. A shaft coupling device comprising:
   a first portion having a female mating section that includes a first cavity surrounded at least in part by a first wall, and a first aperture extending through the first wall, the first aperture having a first axis, and a first shaft mounting section attached to the female mating section;
   wherein the female mating section of the first portion further includes a cutout that intersects with the first aperture, and the cutout includes a base and a depth, and the depth is such that the base of the cutout is disposed adjacent an inner wall surface of the first wall;
   a second portion having a male mating section sized so as to be receivable within the cavity of the female mating section, wherein the male mating section includes a second cavity surrounded at least in part by a second wall, and a second aperture extending through the second wall, the second aperture having a second axis, and a second shaft mounting section attached to the male mounting section;
   a plunger having a body with a width, a length, a height, and a flange, wherein the body length is greater than the body width, and wherein the plunger is disposed within the second cavity of the male mating section and the body of the plunger extends through the second aperture; and
   a spring disposed within the second cavity of the male mating section, wherein the spring acts between the second wall and the plunger;
   wherein in a coupled state, the male mating section is received within the first cavity of the female mating section and the body of the plunger extends through the first aperture and the second aperture in a position where the height of the plunger, the first axis, and the second axis are substantially parallel one another, and the plunger is biased in place by the spring.

2. The shaft coupling device of claim 1, wherein the cutout is positioned substantially perpendicular to the length of the plunger.

3. A coupling device comprising:
   a first portion having a female mating section that includes a first cavity surrounded at least in part by a first wall, and a first aperture extending through the first wall, the first aperture having a first axis, and a first shaft mounting section attached to the female mating section;
   wherein the female mating section of the first portion further includes a cutout that intersects with the first aperture, and the cutout includes a base and a depth, and the depth is such that the base of the cutout is disposed adjacent an inner wall surface of the first wall;
   a second portion having a male mating section sized so as to be receivable within the cavity of the female mating section, wherein the male mating section includes a second cavity surrounded at least in part by a second wall, and a second aperture extending through the second wall, the second aperture having a second axis, and a second shaft mounting section attached to the male mounting section;
   a plunger having a body with a width, a length, a height, and a flange, wherein the body length is greater than the body width, and wherein the plunger is disposed within the second cavity of the male mating section and the body of the plunger extends through the second aperture; and
   a spring disposed within the second cavity of the male mating section, wherein the spring acts between the second wall and the plunger;
   wherein in a coupled state, the male mating section is received within the first cavity of the female mating section and the body of the plunger extends through the first aperture and the second aperture in a position where the height of the plunger, the first axis, and the second axis are substantially parallel one another, and the plunger is biased in place by the spring.

4. The coupling device of claim 3, wherein the cutout is positioned substantially perpendicular to the length of the plunger.

5. A coupling device, comprising:
   a first portion having a female mating section that includes a first cavity surrounded at least in part by a first wall, and a first aperture extending through the first wall, and a first mounting section attached to the female mating section, wherein the first aperture has a length and a width;
   wherein the female mating section further includes a cutout that intersects with the first aperture, and the cutout includes a base and a depth, and the depth is such that the base of the cutout is disposed adjacent an inner wall surface of the first wall;
   a second portion having a male mating section sized so as to be receivable within the cavity of the female mating section, wherein the male mating section includes a second cavity surrounded at least in part by a second wall, and a second aperture extending through the second wall, and a second mounting section attached to the male mounting section;

a plunger having a flange, and a body with a width, a length, and a height, wherein the plunger is at least partially disposed within the second cavity of the male mating section and the body of the plunger extends through the second aperture; and a spring disposed within the second cavity of the male mating section, wherein the spring acts between the second wall and the plunger;

wherein in a coupled state, the male mating section is received within the first cavity of the female mating section and the body of the plunger extends through the first aperture and the second aperture, and the plunger is biased in place by the spring.

6. The coupling device of claim 5, wherein the cutout is positioned substantially perpendicular to a line extending between the first mounting section and the second section.

* * * * *